Dec. 9, 1924.  
E. SCHRÖDER  
1,519,063  
ELECTRIC SEAM WELDING MACHINE  
Filed May 22, 1922

INVENTOR.  
Edmund Schröder:  
By William C. Linton  
Atty.

Patented Dec. 9, 1924.

1,519,063

UNITED STATES PATENT OFFICE.

EDMUND SCHRÖDER, OF BERLIN, GERMANY, ASSIGNOR TO THE FIRM, BRAUN-BRÜNING & CO., OF BASEL, SWITZERLAND.

ELECTRIC SEAM-WELDING MACHINE.

Application filed May 22, 1922. Serial No. 562,757.

*To all whom it may concern:*

Be it known that I, EDMUND SCHRÖDER, a citizen of the German Republic, residing at Berlin, in the Republic of Germany, have invented a certain new and useful Improved Electric Seam-Welding Machine; and I do hereby declare that the following is a full, clear, and exact description of the invention, such as will enable others skilled in the art to which it appertains to make and use the same.

This invention relates to an electric seam welding machine, the distinguishing feature of which resides in the specially advantageous configuration of the welding electrode.

The invention is illustrated, by way of example, in the accompanying drawing, in which similar letters denote similar parts throughout the several views and in which.

The lower electrode A (Figs. 1, 2, 5) consists of a cylindrical mandrel while the upper electrode consists of a cylindrical body B provided with a thread which is the welding member proper of the latter. When commencing the welding operation, the position of the electrode B relatively to the electrode A is such that the extreme point 1 of the thread $a$ lies at the commencement of the line in which the seam welding operation will proceed. Supposing, the welding current has been switched in, the welding operation is effected, first, at the point 1, whereupon the circuit is broken, the electrode B remaining for a short time in the position it has occupied during the welding operation. At this time, it is lifted off the electrode A and rotated so that the point 2 (Fig. 2) gets into the welding line. Now the current is again switched in and the just mentioned phases are repeated. This step by step operation is continued until the whole seam has been finished. The next welding point of the electrode, after the point 2, is, of course, the point 3, then the point 4, and so on to the other extreme point of the thread $a$.

Figure 2:
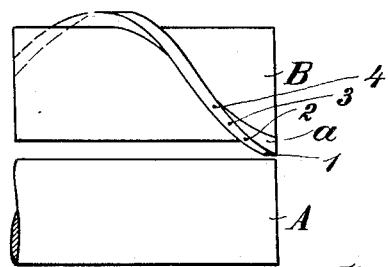
Figure 2 is a side view of the same, of which the upper electrode is of the novel kind forming the subject matter of this invention.
Figure 3:
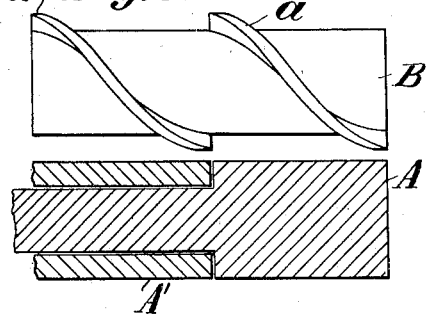
Figure 3 is a view similar to Figure 2 except that the lower electrode is shown in section and somewhat modified in construction.
Figure 4:
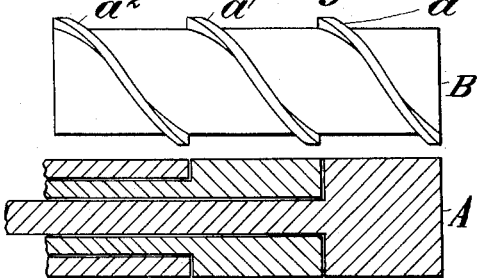
Figure 4 is a view corresponding to Figure 3 showing another modification of the lower electrode.

Instead of providing the electrode body B with but one thread, or portion of a thread, as $a$ in Figure 2, it may have two thread portions, indicated at $a$ and $a'$ in Figure 3, or three thread portions indicated at $a$, $a'$, and $a^2$ in Figure 4. Corresponding to the plurality of the thread portions, the stationary lower electrode consists then of two portions A and A' as in Figure 3, or of three portions A, A', and A², as in Figure 4.

Figure 1:
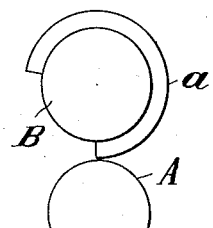
Figure 1 is a front elevation of the two cooperating electrodes.

The form of construction shown in Figures 1 and 2 is intended for cooperation with a one-phase current, and the other two, (Figures 3 and 4) are intended for cooperation with a two-phase current, or a three-phase current respectively. The electrode portions A and A', or A, A' and A² respectively, are separately connected with the separate phase-wires, and the thread portions $a$ and $a'$ or $a$, $a'$ and $a^2$ respectively, close the circuit at two or three points which lie in series with respect to each other. Special sliding contacts conducting the current from stationary parts to movable ones may thus be dispensed with.

Figures 5, 7:
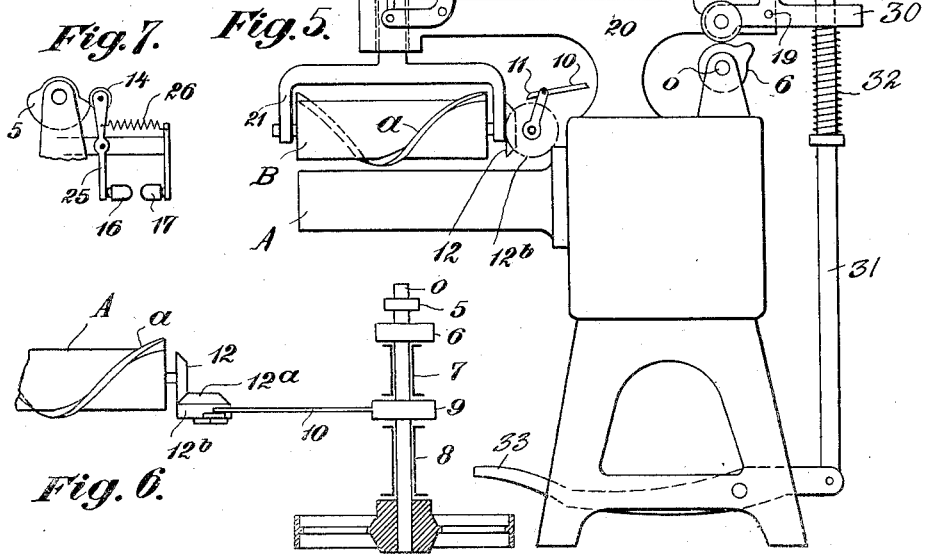
Figure 5 is a side view of a complete welding machine provided with the novel electrode.

The proper succession of the welding phases may be effected in a positive manner, for instance, by the means illustrated in Figures 5, 6 and 7, in connection with a one-phase current machine, as follows:

O indicates a driving shaft provided with two cams 5 and 6, of which the first serves for switching the current in the proper way, whereas the other serves for lifting the upper electrode B at the proper time from the lower electrode. The cam 6 cooperates with a roll 13 attached to one arm of a bell-crank lever 18 fulcrumed at 19 in the front extremity of the head 20 of the machine. The rear extremity of the head 20 forms a guide 20ª for the electrode-holder 21, the guiding stem of which is connected with the bell-crank lever by another bell-crank lever 22 through the connecting rods 23 and 24. Thus, it is obvious that the electrode B will be alternately lifted and lowered by the action of the cam 6 upon the roll 13. The bell crank lever 18 is provided with an extended arm 30 through which extends a rod 31, and arranged between a collar carried by the rod and the lower face of the arm 30 is a coil spring 32. The lower end of this rod is connected to a foot pedal 33 whereby when pressure is applied thereto, the tension of the coil spring is increased so that the roller 13 of the bell-crank lever 18 will be forced against the periphery of the cam 6. By so applying pressure to the roller 13, a more positive actuation of the movable electrode is effected.

The shaft O has secured to it, a cam 9 by which the electrode B is rotated in steps during these periods in which it is not in contact with the electrode A. The supporting shaft of the electrode B has keyed to it a bevel gear 12 which meshes with a bevel gear $12^a$ combined with a ratchet-wheel $12^b$ which latter cooperates with a pawl 11 attached to a rod 10. This rod 10 is reciprocated by the cam 9 so that the electrode B is, in certain intervals, correspondingly rotated in steps.

Figure 6:
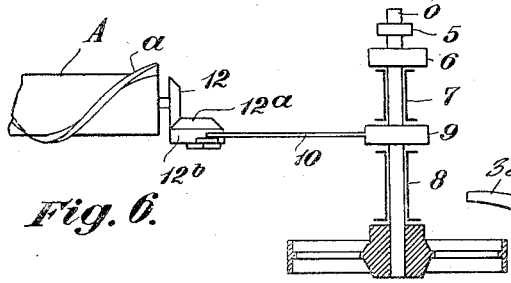
Figure 6 is a fragmental detail partly in section of some of the operating parts of the machine; and, Figure 7 is a side view of certain elements of the machine.

In the Figure 6, the numerals 7 and 8 designate the bearings of the shaft O. The switch actuated by the cam 5 is separately illustrated in Figure 7. This cam 5 oscillates a double-armed lever 25 having a roller 14 mounted in its upper end and at its lower end, a contact 16 is arranged which, normally, is pressed against an associate contact 17 by means of a spiral spring 26. The contacts are separated by the action of the cam 5 upon the roll 14 during those periods in which the electrode B is lifted off the electrode A.

The thread portion $a$ consists, or the thread portions $a, a'$, or $a, a', a^2$ respectively, consist, preferably of a copper bar, or of copper bars, of quadrangular transverse section which is, or are, inserted into a suitably provided groove, or suitably provided grooves, about the circumference of the electrode B.

Having now described my invention, what I desire to secure by Letters Patent of the United States is:

1. The combination with an electric seam welding machine, a stationary electrode, a movable electrode arranged parallel to the stationary electrode, means for intermittently lifting the movable electrode from the seam of the work piece carried by said stationary electrode and causing it to again contact with the seam, and means for interrupting the welding circuit during the moments of the breaks of the contact, of a thread disposed about said movable electrode and forming the welding member proper of the same.

2. The combination with an electric seam welding machine, a stationary electrode composed of at least two coaxially arranged parts adapted to cooperate with a multiple phase current, a movable electrode arranged in parallelism to the stationary electrode, means for intermittently lifting the movable electrode off the seam of the work piece carried by said stationary electrode and making it again contact with said seam, and means for interrupting the welding circuit during the moments of the breaks of the contact, of at least two separate thread portions running around the said movable electrode and forming its welding members proper, each thread portion being adapted to cooperate with a distinct portion of the said stationary electrode, substantially as described.

In witness whereof I have hereunto set my hand.

EDMUND SCHRÖDER.